(12) United States Patent
Asnaashari

(10) Patent No.: US 7,102,671 B1
(45) Date of Patent: Sep. 5, 2006

(54) ENHANCED COMPACT FLASH MEMORY CARD

(75) Inventor: Mehdi Asnaashari, San Jose, CA (US)

(73) Assignee: Lexar Media, Inc., Fremont, CA (US)

( * ) Notice: Subject to any disclaimer, the term of this patent is extended or adjusted under 35 U.S.C. 154(b) by 0 days.

(21) Appl. No.: 09/500,755

(22) Filed: Feb. 8, 2000

(51) Int. Cl.
*H04N 5/76* (2006.01)

(52) U.S. Cl. .................................. 348/231.9

(58) Field of Classification Search ............ 348/231.7, 348/231.8, 231.9; 361/686; 709/213; 710/62, 710/63, 64, 65, 71, 72, 74
See application file for complete search history.

(56) References Cited

U.S. PATENT DOCUMENTS

| | | | |
|---|---|---|---|
| 4,099,069 A | 7/1978 | Cricchi et al. | |
| 4,130,900 A | 12/1978 | Watanabe | |
| 4,210,959 A | 7/1980 | Wozniak | 364/200 |
| 4,309,627 A | 1/1982 | Tabata | |
| 4,355,376 A | 10/1982 | Gould | 365/230 |
| 4,398,248 A | 8/1983 | Hsia et al. | |
| 4,405,952 A | 9/1983 | Slakmon | 360/49 |
| 4,414,627 A | 11/1983 | Nakamura | |
| 4,450,559 A | 5/1984 | Bond et al. | 371/10 |
| 4,456,971 A | 6/1984 | Fukuda et al. | 364/900 |
| 4,468,730 A | 8/1984 | Dodd et al. | |
| 4,473,878 A | 9/1984 | Zolnowsky et al. | |
| 4,476,526 A | 10/1984 | Dodd | |
| 4,498,146 A | 2/1985 | Martinez | 364/900 |
| 4,525,839 A | 6/1985 | Nozawa et al. | 371/38 |
| 4,532,590 A | 7/1985 | Wallach et al. | |
| 4,609,833 A | 9/1986 | Gutterman | |
| 4,616,311 A | 10/1986 | Sato | 364/200 |
| 4,654,847 A | 3/1987 | Dutton | 371/10 |
| 4,710,871 A | 12/1987 | Belknap et al. | 364/200 |
| 4,746,998 A | 5/1988 | Robinson et al. | 360/72.1 |
| 4,748,320 A | 5/1988 | Yorimoto et al. | 235/492 |
| 4,757,474 A | 7/1988 | Fukushi et al. | 365/189 |
| 4,774,700 A | 9/1988 | Satoh et al. | 369/54 |
| 4,780,855 A | 10/1988 | Iida et al. | |
| 4,788,665 A | 11/1988 | Fukuda et al. | |
| 4,797,543 A | 1/1989 | Watanabe | |
| 4,800,520 A | 1/1989 | Iijima | 364/900 |
| 4,829,169 A | 5/1989 | Watanabe | |
| 4,843,224 A | 6/1989 | Ohta et al. | |
| 4,896,262 A | 1/1990 | Wayama et al. | 364/200 |
| 4,914,529 A | 4/1990 | Bonke | 360/48 |

(Continued)

FOREIGN PATENT DOCUMENTS

EP    0 392 895 A2    10/1990

(Continued)

OTHER PUBLICATIONS

Mendel Rosenblum and John K. Ousterhout, The Design and Implementation of a Log-Structured File System, article, 1991, 15 pgs., Berkeley, USA.

(Continued)

*Primary Examiner*—Tuan Ho
*Assistant Examiner*—Jason Whipkey
(74) *Attorney, Agent, or Firm*—Law Offices Of Imam

(57) ABSTRACT

An embodiment of the present invention includes a digital camera system having a digital camera and a computer for transferring pictures of images taken by the digital camera therebetween. The digital camera system includes a card removably and directly coupled, without any intermediary device, between the digital camera and the computer for temporarily storing the images and for transferring the temporarily stored images to the computer for viewing, editing and reproduction thereof.

14 Claims, 11 Drawing Sheets

U.S. PATENT DOCUMENTS

| | | | |
|---|---|---|---|
| 4,920,518 A | 4/1990 | Nakamura et al. | 365/228 |
| 4,924,331 A | 5/1990 | Robinson et al. | 360/72.1 |
| 4,943,745 A | 7/1990 | Watanabe et al. | |
| 4,953,122 A | 8/1990 | Williams | 364/900 |
| 4,970,642 A | 11/1990 | Yamamura | |
| 4,970,727 A | 11/1990 | Miyawaki et al. | |
| 5,070,474 A | 12/1991 | Tuma et al. | 395/500 |
| 5,093,785 A | 3/1992 | Iijima | |
| 5,168,465 A | 12/1992 | Harari | 257/320 |
| 5,198,380 A | 3/1993 | Harari | 437/43 |
| 5,200,959 A | 4/1993 | Gross et al. | 371/21.6 |
| 5,218,695 A | 6/1993 | Noveck et al. | |
| 5,220,518 A | 6/1993 | Haq | |
| 5,226,168 A | 7/1993 | Kobayashi et al. | 395/800 |
| 5,227,714 A | 7/1993 | Lou | |
| 5,253,351 A | 10/1993 | Yamamoto et al. | |
| 5,267,218 A | 11/1993 | Elbert | |
| 5,268,318 A | 12/1993 | Harari | 437/43 |
| 5,268,870 A | 12/1993 | Harari | 365/218 |
| 5,270,979 A | 12/1993 | Harari et al. | 365/218 |
| 5,293,560 A | 3/1994 | Harari | 365/185 |
| 5,297,148 A | 3/1994 | Harari et al. | 371/10.2 |
| 5,303,198 A | 4/1994 | Adachi et al. | |
| 5,305,276 A | 4/1994 | Uenoyama | |
| 5,305,278 A | 4/1994 | Inoue | |
| 5,315,541 A | 5/1994 | Harari et al. | 365/63 |
| 5,315,558 A | 5/1994 | Hag | |
| 5,329,491 A | 7/1994 | Brown et al. | |
| 5,337,275 A | 8/1994 | Garner | 365/189.01 |
| 5,341,330 A | 8/1994 | Wells et al. | |
| 5,341,339 A | 8/1994 | Wells | |
| 5,341,341 A | 8/1994 | Fukazo | |
| 5,353,256 A | 10/1994 | Fandrich et al. | 365/230.03 |
| 5,357,475 A | 10/1994 | Hasbun et al. | 365/218 |
| 5,359,569 A | 10/1994 | Fujita et al. | |
| 5,365,127 A | 11/1994 | Manley | |
| 5,369,615 A | 11/1994 | Harari et al. | 365/218 |
| 5,371,702 A | 12/1994 | Nakai et al. | |
| 5,381,539 A | 1/1995 | Yanai et al. | |
| 5,382,839 A | 1/1995 | Shinohara | |
| 5,384,743 A | 1/1995 | Rouy | |
| 5,388,083 A | 2/1995 | Assar et al. | |
| 5,396,468 A | 3/1995 | Harari et al. | 365/218 |
| 5,404,485 A | 4/1995 | Ban | |
| 5,406,527 A | 4/1995 | Honma | |
| 5,418,752 A | 5/1995 | Harari et al. | |
| 5,422,842 A | 6/1995 | Cernea et al. | 365/185 |
| 5,422,856 A | 6/1995 | Sasaki et al. | |
| 5,428,621 A | 6/1995 | Mehrotra et al. | 371/21.4 |
| 5,430,682 A | 7/1995 | Ishikawa et al. | |
| 5,430,859 A | 7/1995 | Norman et al. | 395/425 |
| 5,431,330 A | 7/1995 | Wieres | |
| 5,434,825 A | 7/1995 | Harari | 365/185 |
| 5,438,573 A | 8/1995 | Mangan et al. | 371/10.3 |
| 5,465,235 A | 11/1995 | Miyamoto | |
| 5,465,338 A | 11/1995 | Clay | |
| 5,471,478 A | 11/1995 | Mangan et al. | 371/10.3 |
| 5,473,765 A | 12/1995 | Gibbons et al. | |
| 5,479,638 A | 12/1995 | Assar et al. | |
| 5,485,595 A | 1/1996 | Assar et al. | 395/430 |
| 5,490,117 A | 2/1996 | Oda et al. | |
| 5,495,442 A | 2/1996 | Cernea et al. | 365/185.03 |
| 5,504,760 A | 4/1996 | Harari et al. | 371/40.1 |
| 5,508,971 A | 4/1996 | Cernea et al. | 365/185.23 |
| 5,513,138 A | 4/1996 | Manabe et al. | |
| 5,515,333 A | 5/1996 | Fujita et al. | |
| 5,519,847 A | 5/1996 | Fandrich et al. | |
| 5,523,980 A | 6/1996 | Sakui et al. | |
| 5,524,230 A | 6/1996 | Sakaue et al. | |
| 5,530,673 A | 6/1996 | Tobita et al. | |
| 5,530,828 A | 6/1996 | Kaki et al. | |
| 5,530,938 A | 6/1996 | Akasaka et al. | |
| 5,532,962 A | 7/1996 | Auclair et al. | 365/201 |
| 5,532,964 A | 7/1996 | Cernea et al. | 365/189.09 |
| 5,534,456 A | 7/1996 | Yuan et al. | 437/43 |
| 5,535,328 A | 7/1996 | Harari et al. | 395/182.05 |
| 5,541,551 A | 7/1996 | Brehner et al. | |
| 5,544,118 A | 8/1996 | Harari | 365/218 |
| 5,544,356 A | 8/1996 | Robinson | |
| 5,552,698 A | 9/1996 | Tai et al. | |
| 5,554,553 A | 9/1996 | Harari | 437/43 |
| 5,563,825 A | 10/1996 | Cernea et al. | 365/185.18 |
| 5,566,314 A | 10/1996 | DeMarco et al. | 395/430 |
| 5,568,439 A | 10/1996 | Harari | 365/218 |
| 5,572,466 A | 11/1996 | Sukegawa | |
| 5,579,502 A | 11/1996 | Konishi et al. | |
| 5,581,723 A | 12/1996 | Hasbun et al. | |
| 5,583,812 A | 12/1996 | Harari | 365/185.33 |
| 5,592,415 A | 1/1997 | Kato et al. | |
| 5,592,420 A | 1/1997 | Cernea et al. | 365/185.18 |
| 5,596,526 A | 1/1997 | Assar et al. | |
| 5,598,370 A | 1/1997 | Niisima et al. | |
| 5,602,987 A | 2/1997 | Harari et al. | |
| 5,603,001 A | 2/1997 | Sukegawa et al. | |
| 5,606,660 A | 2/1997 | Estakhri et al. | |
| 5,611,067 A | 3/1997 | Okamoto et al. | |
| 5,640,528 A | 6/1997 | Harney et al. | |
| 5,642,312 A | 6/1997 | Harari | 365/185.33 |
| 5,648,929 A | 7/1997 | Miyamoto | |
| 5,663,901 A | 9/1997 | Wallace et al. | 365/52 |
| 5,693,570 A | 12/1997 | Cernea et al. | 437/205 |
| 5,712,819 A | 1/1998 | Harari | 365/185.29 |
| 5,719,808 A | 2/1998 | Harari et al. | 365/185.33 |
| 5,723,990 A | 3/1998 | Roohparvar | |
| 5,734,567 A | 3/1998 | Griffiths et al. | |
| 5,745,418 A | 4/1998 | Ma et al. | |
| 5,754,567 A | 5/1998 | Norman | |
| 5,757,712 A | 5/1998 | Nagel et al. | |
| 5,758,100 A | 5/1998 | Odisho | |
| 5,761,117 A | 6/1998 | Uchino et al. | |
| 5,768,190 A | 6/1998 | Tanaka et al. | |
| 5,768,195 A | 6/1998 | Nakamura et al. | |
| 5,773,901 A | 6/1998 | Kanter | |
| 5,778,418 A | 7/1998 | Auclair et al. | 711/101 |
| 5,781,478 A | 7/1998 | Takeeuchi et al. | |
| 5,787,445 A | 7/1998 | Daberko | |
| 5,787,484 A | 7/1998 | Norman | |
| RE35,881 E | 8/1998 | Barrett et al. | |
| 5,799,168 A | 8/1998 | Ban | |
| 5,802,551 A | 9/1998 | Komatsu et al. | |
| 5,809,515 A | 9/1998 | Kaki et al. | |
| 5,809,558 A | 9/1998 | Matthews et al. | |
| 5,809,560 A | 9/1998 | Schneider | |
| 5,818,350 A | 10/1998 | Estakhri et al. | |
| 5,818,781 A | 10/1998 | Estakhri et al. | |
| 5,822,245 A | 10/1998 | Gupta et al. | |
| 5,822,252 A | 10/1998 | Lee et al. | |
| 5,822,781 A | 10/1998 | Wells et al. | |
| 5,831,929 A | 11/1998 | Manning | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,847,552 A | 12/1998 | Brown | |
| 5,860,083 A | 1/1999 | Sukeawa | |
| 5,860,124 A | 1/1999 | Matthews et al. | |
| 5,862,099 A | 1/1999 | Gannage et al. | |
| 5,890,192 A | 3/1999 | Lee et al. | |
| 5,901,086 A | 5/1999 | Wang et al. | |
| 5,907,856 A | 5/1999 | Estakhri et al. | |
| 5,909,586 A | 6/1999 | Anderson | |
| 5,914,737 A * | 6/1999 | Silverbrook | 347/48 |
| 5,920,884 A | 7/1999 | Jennings, III et al. | |
| 5,924,113 A | 7/1999 | Estakhri et al. | |
| 5,928,370 A | 7/1999 | Asnaashari | |

| Patent Number | Date | Inventor |
|---|---|---|
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino et al. |
| 5,986,933 A | 11/1999 | Takeuchi et al. |
| 5,987,563 A | 11/1999 | Itoh et al. |
| 5,987,573 A | 11/1999 | Hiraka |
| 5,991,849 A | 11/1999 | Yamada et al. |
| 6,011,322 A | 1/2000 | Stunfall et al. |
| 6,011,323 A | 1/2000 | Camp |
| 6,018,265 A | 1/2000 | Keshtbod |
| 6,021,408 A | 2/2000 | Ledain et al. |
| 6,026,020 A | 2/2000 | Matsubara et al. |
| 6,026,027 A | 2/2000 | Terrell, II et al. |
| 6,034,897 A | 3/2000 | Estakhri et al. |
| 6,035,357 A | 3/2000 | Sakaki |
| 6,040,997 A | 3/2000 | Estakhri |
| 6,041,001 A | 3/2000 | Estakhri |
| 6,047,352 A | 4/2000 | Lakhani et al. |
| 6,055,184 A | 4/2000 | Acharya et al. |
| 6,055,188 A | 4/2000 | Takeuchi et al. |
| 6,069,827 A | 5/2000 | Sinclair |
| 6,072,796 A | 6/2000 | Christensen et al. |
| 6,076,137 A | 6/2000 | Asnaashari |
| 6,081,447 A | 6/2000 | Lofgren et al. |
| 6,081,878 A | 6/2000 | Estakhri et al. |
| 6,084,483 A | 7/2000 | Keshtbod |
| 6,097,666 A | 8/2000 | Sakui et al. |
| 6,115,785 A | 9/2000 | Estakhri et al. |
| 6,122,195 A | 9/2000 | Estakhri et al. |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,141,249 A | 10/2000 | Estakhri et al. |
| 6,145,051 A | 11/2000 | Estakhri et al. |
| 6,151,247 A | 11/2000 | Estakhri et al. |
| 6,151,652 A * | 11/2000 | Kondo et al. .................. 710/62 |
| 6,172,906 B1 | 1/2001 | Estakhri et al. |
| 6,173,362 B1 | 1/2001 | Yoda |
| 6,181,118 B1 | 1/2001 | Meehan et al. |
| 6,182,162 B1 | 1/2001 | Estakhri et al. |
| 6,202,138 B1 | 3/2001 | Estakhri et al. |
| 6,223,308 B1 | 4/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,275,436 B1 | 8/2001 | Tobita et al. |
| 6,279,069 B1 | 8/2001 | Robinson et al. |
| 6,279,114 B1 | 8/2001 | Toombs et al. |
| 6,285,607 B1 | 9/2001 | Sinclair |
| 6,292,863 B1 * | 9/2001 | Terasaki et al. ............. 710/313 |
| 6,327,639 B1 | 12/2001 | Asnaashari |
| 6,345,367 B1 | 2/2002 | Sinclair |
| 6,374,337 B1 | 4/2002 | Estakhri |
| 6,385,667 B1 | 5/2002 | Estakhri et al. |
| 6,393,513 B1 | 5/2002 | Estakhri et al. |
| 6,397,314 B1 | 5/2002 | Estakhri et al. |
| 6,411,546 B1 | 6/2002 | Estakhri et al. |
| 6,427,186 B1 * | 7/2002 | Lin et al. .................... 711/103 |
| 6,434,648 B1 * | 8/2002 | Assour et al. ................. 710/62 |
| 6,467,021 B1 | 10/2002 | Sinclair |
| 6,490,649 B1 | 12/2002 | Sinclair |
| 6,567,307 B1 | 5/2003 | Estakhri |
| 6,578,127 B1 | 6/2003 | Sinclair |
| 6,587,382 B1 | 7/2003 | Estakhri et al. |
| 6,711,059 B1 | 3/2004 | Sinclair et al. |
| 6,718,118 B1 * | 4/2004 | Oguro ........................ 386/46 |
| 6,721,819 B1 | 4/2004 | Estakhri et al. |
| 6,721,843 B1 | 4/2004 | Estakhri |
| 6,725,321 B1 | 4/2004 | Sinclair et al. |
| 6,728,851 B1 | 4/2004 | Estakhri et al. |
| 6,751,155 B1 | 6/2004 | Gorobets |
| 6,757,800 B1 | 6/2004 | Estakhri et al. |
| 6,772,274 B1 | 8/2004 | Estakhri |
| 6,813,678 B1 | 11/2004 | Sinclair et al. |
| 6,833,867 B1 * | 12/2004 | Anderson ................ 348/231.3 |
| 6,898,662 B1 | 5/2005 | Gorobets |
| 6,912,618 B1 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 6,981,068 B1 * | 12/2005 | Harari et al. .................. 710/74 |
| 7,000,064 B1 | 2/2006 | Payne et al. |
| 2003/0033471 A1 | 2/2003 | Lin et al. |
| 2005/0099519 A1 * | 5/2005 | Creamer et al. ....... 348/333.11 |

FOREIGN PATENT DOCUMENTS

| | | |
|---|---|---|
| EP | 0 522 780 A2 | 1/1993 |
| EP | 0 522 780 B1 | 1/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| GB | 2 251 323 | 7/1992 |
| GB | 2 291 990 | 2/1996 |
| GB | 2 291 991 A | 7/1996 |
| GB | 2 297 637 A | 7/1996 |
| GB | 2 304 428 | 3/1997 |
| JP | 3-228377 | 10/1981 |
| JP | 59-45695 A | 9/1982 |
| JP | 58-215794 A | 12/1983 |
| JP | 58-215795 A | 12/1983 |
| JP | 59-92483 | 5/1984 |
| JP | 59-162695 A | 9/1984 |
| JP | 60-212900 | 10/1985 |
| JP | 1-138694 | 5/1989 |
| JP | 4-57295 | 2/1992 |
| JP | 4-254994 | 9/1992 |
| JP | 4-268284 | 9/1992 |
| JP | 4-278297 | 10/1992 |
| JP | 4-332999 A | 11/1992 |
| JP | 5-128877 | 5/1993 |
| JP | 5-282883 | 10/1993 |
| JP | 6-4399 | 1/1994 |
| JP | 6-36578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-84871 | 3/1995 |
| JP | 7-93499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-18018 | 1/1996 |
| JP | RM-37697 | 2/1996 |
| JP | 8-69696 | 3/1996 |
| JP | 9-147581 | 6/1997 |
| SU | 1388877 A1 | 4/1988 |
| SU | 1408439 A1 | 7/1988 |
| SU | 1515164 A1 | 10/1989 |
| SU | 1541619 A1 | 2/1990 |

| | | |
|---|---|---|
| SU | 1573458 A2 | 6/1990 |
| SU | 1686449 A2 | 10/1991 |
| WO | WO 94/20906 | 9/1994 |

OTHER PUBLICATIONS

Brian Dipert and Markus Levy, Designing with Flash Memory, book, Apr. 1994, 445 pgs., Annabooks, San Diego, USA.

Science Forum, Inc., Flash Memory Symposium '95,symposium, 1995, 13 pgs.; Hongo, Bunkyo-ku, Tokyo.

Ross S. Finlayson and David R. Cheriton, An Extended File Service Exploiting Write-Once Storage, article, 1987, 10 pgs. ACM.

Jason Gait, The Optical File Cabinet: A Random-Access File System for Write-Once Optical Disks, article, Jun. 1988, 12 pgs., Beaverton, Oregon.

Henry G. Baker, Memory Management, book, 1995, 19 pgs., Springer-Verlag Berlin Heidelberg, Germany.

Sape J. Mullender and Andrew S. Tanenbaum, A Distributed File Service Based on Optimistic Concurrency Control, article, 1985, 12 pgs., ACM.

Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers,, 2 pgs.

Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs.., vol. E79-C, No. 6.

Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid -State Circuits, vol. 26, No. 4.

Kai Hwang and Faye A. Briggs, Computer Architecture and Parallel Processing, book, 1984, McGraw-Hill, Inc., 2 pgs., US.

Walter Lahti and Dean McCarron, State of the Art: Magnetic VS. Optical Store Data in a Flash, article, 1990, 7 pgs., vol. 15, No. 12, McGraw-Hill, Inc., US.

Ron Wilson, Integrated Circuits; 1-Mbit flash memories seek their role in system design, article, Mar. 1, 1989, 2 pgs., No. 6, Tulsa, OK.

S. Mehroura, J.H. Yuan, R.A. Cemea, W.Y. Chien, D.C. Guteman, G. Samachisa, R.D. Noman, M. Mofidi, W.Lee, Y. Fong, A. Mihnea , E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium, 1992, 2 pgs., Mountain View, CA.

Steven H. Leibson, Nonvolatile, in-circuit-reprogrammable memories, article, Jan. 3, 1991, 12 pgs., EDN, Circle No. 12.

Walter Lahti and Dean McCarron, State of the Art: Magnetic VS. Optical Store Data in a Flash, article, 1990, 7 pgs., vol. 15, No. 12, McGraw-Hill, Inc., US.

Kai Hwang and Faye A. Briggs, Computer Architecture and Parallel Processing, book, 1984, McGraw-Hill, Inc., 2 pgs., US.

Steven H. Leibson, Nonvolatile, in-circuit-reprogrammable memories, article, Jan. 3, 1991, 12 pgs., EDN, Circle No. 12.

Ramon Caceres, Fred Douglis, Kai Li and Brian Marsh, Operationg System Implications of Solid-State Mobile Computers, article, 7 pgs., Oct. 1993, Workshop on Workstation Operting Systems.

Michael Wu and Wily Zwaenepoel, A Non-Volatile, Main Memory Storage System, 12 pgs., 1994, ACM, San Jose, CA USA.

Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v.42, n.10, The Gale Group.

Anthony Cataldo, New flash enhancements up ante. (Intel's 28F400BV-120 and 28F004BV-120, Atmel's AT29BV010 and AT29BV020, and Samsung Semiconductor's KM29V32000 *flash* memory* devices)(Product Announcement), article, Mar. 13, 1995, 4 pgs., Electronic News, v.41, n.2056, The Gale Group.

Sam Weber, *Flash* modules' portability, reusability, small size valued for a host of APPs-Consumer formats flocking to *flash*, article, Jul. 22, 1996, 9 pgs., Electronic Engineering Times, n.911, CMP Media.

Toshiba, MOS Memory (Non-Volatile), 1995, Data Book.

Stan Baker, But Integration Calls for Hardware, Software Changes: Flash: designers face the dawn of a new memory age, article, Sep. 12, 2003, 5 pgs., Electronic Engineering Times, 1990, N.619, 41, CMP Media.

Toshiba, Toshiba MOS Digital Integrated Circuit Silicon Gate CMOS, (TC58NS512DC) Mar. 21, 2001, 43 pgs., Data Book.

Toshiba Corporation, SMIL (Smartmedia Interface Library) Hardware Edition Version 1.00, Jul. 1, 2000, 36 pgs., Data Book.

Toshiba, Toshiba MOS Digital Integrated Circuit Silicon Gate, (TC58512FT), Mar. 5, 2001, 43 pgs., Data Book.

Toshiba, Toshiba MOS Digital Integrated Circuit Silicon Gate, (TC58DVM92A1FT00), Jan. 10, 2003, 44 pgs., Data Book.

Toshiba, Toshiba MOS Digital Integrated Circuit Silicon Gate, (TC58DVG02A1FT00), Jan. 10, 2003, 44 pgs., Data Book.

Toshiba, Toshiba MOS Digital Integrated Circuit Silicon Gate, (TC58100FT), Mar. 5, 2001, 43 pgs., Data Book.

35Nonvolatile Memory Technology Review, A Time of Change, Proceedings 1993 Conference, Jun. 22-24, 1993, Linthlcum Heights, MD USA.

Toshiba Corporation, SMIL (Smartmedia Interface Library) Software Edition Version 1.00, Jul. 1, 2000, 136 pgs., Data Book.

Toshiba, MOS Memory (Non-Volatile), 1996, 279 pgs., Data Book.

Dan Auclair, Optimal Solid State Disk Architecure For Portable Computers, symposium, Jul. 9, 1991, 7 pgs., SunDisk Corporation.

Magazine—"State of the Art: Magnetic VS. Optical Store Data in a Flash", by Walter Lahti and Dean McCarron, Byte magazine dated Nov. 1, 1990. 311, vol. 15, No. 12.

Magazine—Technology Updates, Integrated Cirrcuits, "1-Mbit flash memories seek their role in system design", Ron Wilson, Senior Editor, Computer Design magazine 28 Mar 1, 1989, No. 5, Tulsa OK, US, pp. 30 and 32.

1992 Symposium of VLSI Circuits Digest of Technical Papers, "EEPROM for Solid State Disk Applications", S. Mehoura et al., SunDisk Corporation. Santa Clara, CA. R.W. Gregor et al., AT&T Bell Laboratories. Allentown, pp. 24 and 25.

* cited by examiner

ENHANCED COMPACT FLASH MEMORY CARD

BACKGROUND OF THE INVENTION

1. Field of the Invention

The present invention relates generally to digital cameras employed with a computer using an interface for transferring digital images captured by the digital cameras and particularly to employing a digital camera with a computer without the use of a card reader.

2. Description of the Prior Art

In recent years, the use of digital cameras has become more prevalent as a consumer product. Whereas previously, digital cameras were used almost exclusively by professional photographers and perceived by the public-at-large as exotic devices, nowadays, digital cameras are used by amateur photographers and seen in many households.

The rising popularity of the digital cameras is due to a number of factors. First, the quality of pictures taken by low price cameras has improved considerably. Second, printers with higher resolution and greater quality have been introduced to the market at increasingly more affordable prices.

However, there has not been a comparative success in the area of connectivity between the digital camera and a computer (personal computer (PC) or Macintosh). Pictures taken by a digital camera, being in digital format, must be transported in some manner from the removable storage media of the camera to the storage media of the computer. Inside of the computer, the pictures may be viewed, edited and ultimately transferred to a printer for printing. Therefore, the need arises to establish communication between the digital camera and the computer without the use of a card reader device or extra circuitry within the digital camera, in the form of a USB port built into the storage media, in order to transport data therebetween while reducing costs associated with establishing such communication.

Inside of the computer, the pictures may be viewed, edited and ultimately sent to a printer for re-production. Thus, there needs to be a transport mechanism, which can establish communication with both the digital camera and the computer in order to transport data therebetween.

At present, there are several different methods of connecting the digital camera to a computer. FIG. 1 illustrates one such mode of connectivity wherein a digital camera 12 is shown to be connected to a desktop computer 19 through a transmission cable 18. Also shown in FIG. 1 are a Personal Computer/Compact FLASH (PC/CF) card 16 as well as a serial or universal serial bus (USB) port 14. Transmission cable 18 connects the serial or the USB port 14 of the digital camera to the serial or USB port of the computer 19.

The pictures taken by the digital camera 12 are stored into the PC/CF card 16 and subsequently transmitted from the serial or the USB port 14 of the camera 12, through the serial or the USB port of the computer 19 and the transmission cable 18, to the computer 19. The main limitation of the type of connection shown in FIG. 1 is that the camera has to stay on while data is being transferred. Thus, not only the camera cannot be used while data is being transferred but the battery of the camera is being drained during the entire transmission process. Another limitation of the method of data transmission shown in FIG. 1 is the additional cost of the digital camera due to the circuitry and software associated with the implementation of the serial or USB port 14. The additional cost may make the camera 12 more expensive than that which is within the reach of the average consumer.

An alternative method of transferring the digital data from a digital camera storage media to a computer is shown in FIG. 2(a). Therein is shown a PC/CF card 28, a card reader 20, a transmission cable 25 and a computer 29. The card reader 20 comprises a housing 24 for the PC/CF card 28 as well as the USB controller circuitry 26 and the USB port 27. The transmission cable 25 connects the USB port 27 of the card reader 20 to the USB port 22 of the computer 29.

The card reader 20 provides a bridge between the computer 29 and the PC/CF card 28. The latter is inserted into the digital camera (not shown in FIG. 2(a)) and stores digital images, enabling it to transfer data between the computer 29 and the camera. The PC/CF card 28 establishes connection with the card reader housing 24 through the PC/CF interface 23. The card reader 20 communicates with the computer 29 through the USB controller circuitry 26.

There are disadvantages associated with employing the card reader 20 in FIG. 2(a) such as the substantial cost associated therewith. In addition, since the card reader 20 acts like a bridge between the USB bus 22 on the one hand and the PC/CF bus 23 on the other hand, it does not utilize either of the busses fully. Neither can the card reader 20 optimize the interface between the computer 29 and the PC/CF card 28 because of its lack of direct communication with the internal circuitry of the storage media of either of the two devices. Finally, the card reader 20 has the disadvantage of duplicating logic in circuitry 26 since it must have a PC/CF interface as well as a USB interface in order to establish communication between the PC/CF card 28 and computer 29. The PC/CF card 28 also includes the PC/CF interface 23, as shown in FIG. 2(a).

Another limitation of the prior art systems employing card readers is illustrated in FIG. 2(b) wherein a computer screen is depicted with icon 31 indicating that a removable disk F is connected to the computer. However, icon 31 is displayed as soon as the card reader is connected to the computer regardless of whether there is any PC/CF card in the card reader or not. Therefore, it is misleading to the user as to whether or not the PC/CF card is actually connected to the computer by that which is displayed by the icon 31.

Thus, the need arises for coupling a digital camera's storage media to a PC by avoiding the need for an intermediary interface, such as a card reader, thereby reducing costs, avoiding duplicate circuitry and allowing for a direct connection between a PC/CF card and the PC and thereby allowing for efficient utilization of the interface busses used for connecting the PC/CF card to the PC.

SUMMARY OF THE INVENTION

Briefly, an embodiment of the present invention includes a digital camera system having a digital camera and a computer for transferring pictures of images taken by the digital camera therebetween. The digital camera system includes a card removably and directly coupled, without any intermediary device, between the digital camera and the computer for temporarily storing the images and for transferring the temporarily stored images to the computer for viewing, editing and reproduction thereof.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 3:
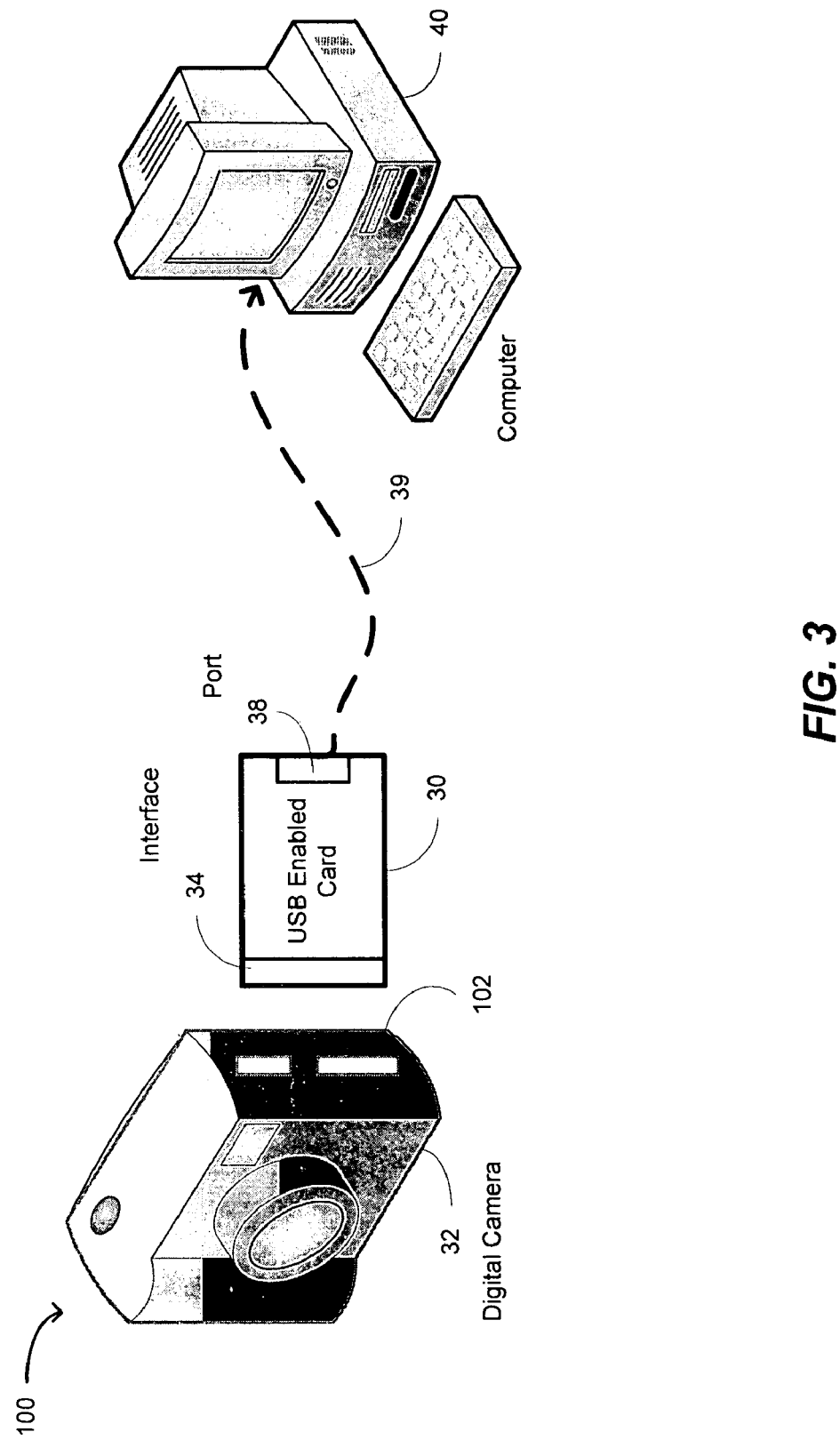
FIG. 3 shows the preferred embodiment of the removable storage media (PC/CF) card communicating with the computer.

Referring now to FIG. 3, a digital camera system 100 is shown to include a digital camera 32 and a computer 40 in accordance with an embodiment of the present invention. Digital information, data, is transferred between the digital camera 32 and the computer 40 with the use of a card 30 which, when inserted into the card slot 102 of the digital camera 32, communicates with the digital camera 32 through an interface 34. In one embodiment of the present invention, 34 is a PCMCIA/CF interface, a well-known standard in the industry, and 30 is a PC/CF card.

In yet another embodiment of the present invention, the interface 34 is a memory stick interface.

The pictures taken by the digital camera 32, in digital format, are transferred to the card 30 through the interface 34 when the card is inserted into the card slot 102 of the digital camera 32. Subsequently, the card 30 may be removed from the digital camera 32 and mounted, as a removable disk, onto the computer 40 as indicated by the broken arrow 39 in FIG. 3. Once mounted onto the computer 40, the card 30 communicates with the latter through a port 38 to transfer digital images from the card 30, taken by the digital camera 32, to the computer 40. In one embodiment of the present invention, the port 38 is a USB port. The pictures taken by the digital camera 32 may thus be viewed, edited and/or copied by the computer 40.

Alternatively, the digital camera 32 may be replaced with other types of digital equipment without departing from the scope and spirit of the present invention. For example, the digital camera 32 in other embodiments of the present invention may be replaced with an MP3 player or a palm computer or other similar device requiring the transportation of data between the device and a computer.

Figure 4:
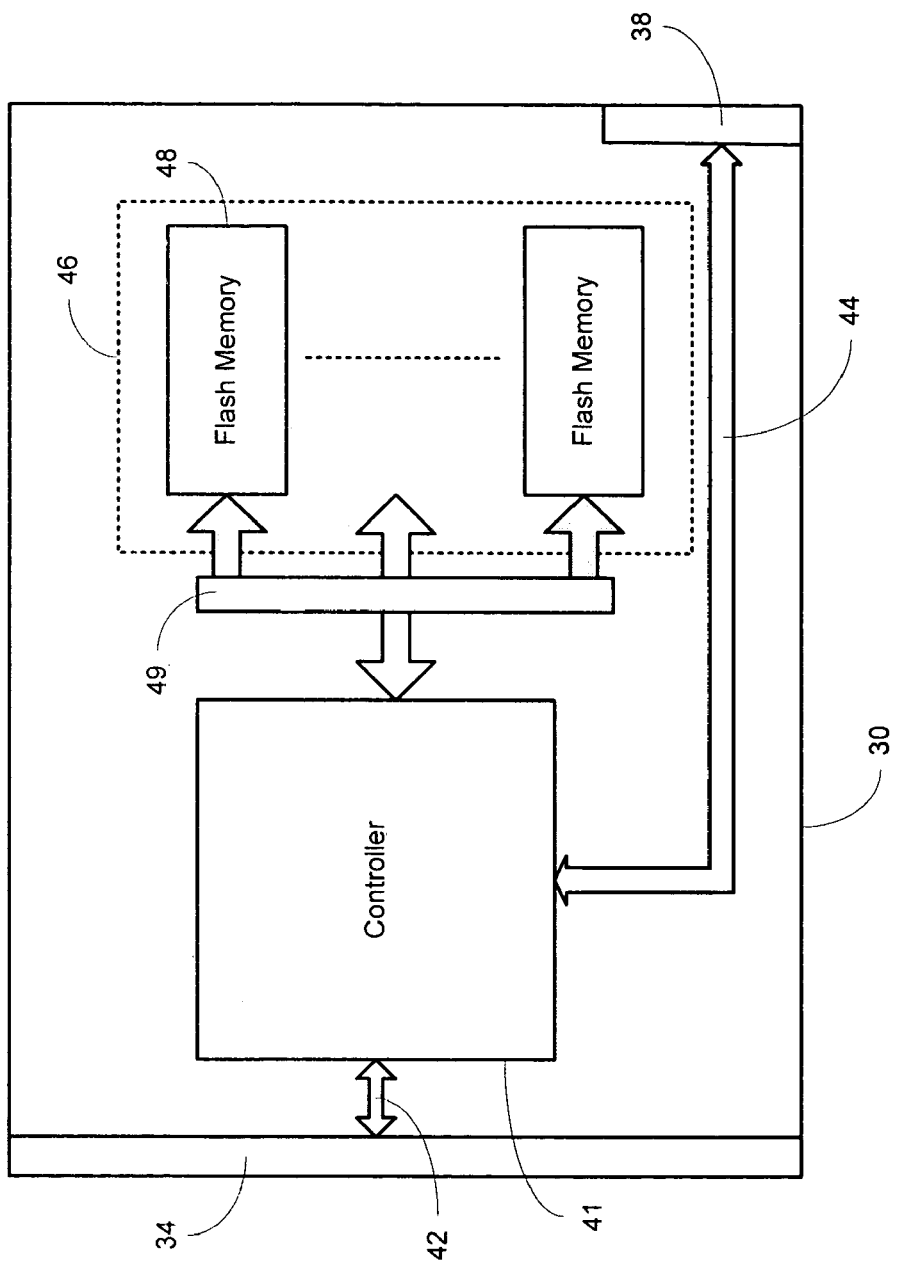
FIG. 4 shows a block diagram of a preferred embodiment of the removable storage media (PC/CF) card with both the Personal Computer Memory Card International Association/Compact FLASH (PCMCIA/CF) interface to communicate with a camera as well as the USB interface to communicate with a computer.

FIG. 4 illustrates a high-level block diagram of the card 30 according to an embodiment of the present invention. The card 30 is shown to include a controller 41, an array of FLASH memory chips 46, a FLASH interface bus 49, a USB interface bus 44, an interface 34, the port 38 and a host interface bus 42.

The controller 41 is coupled to the interface 34 through the host interface bus 42. Further, the controller 41 is coupled to the port 38, through the USB interface bus 44, and to the array of FLASH memory chips 46 through the FLASH interface bus 49. The FLASH memory array 46 includes a plurality of memory chips each of which is designated as 48 in FIG. 4.

The controller 41 communicates with a digital camera through the interface 34. The host interface bus 42, which couples the controller 41 with the interface 34, is a parallel interface and acts like a real-time interface in transferring data at a high rate from the digital camera to the FALSH memory array 46. On the other hand, the USB interface bus 44, which couples the controller 41 with the port 38 is a serial interface with considerably less bandwidth than that of the host interface bus 42. The reason for using the port 38 is that most computers are equipped with USB interfaces. Controller 41 performs a variety of functions including reading and writing information to the array of FLASH memory chips 46 through either the interface 34 or the port 38.

Figure 5:
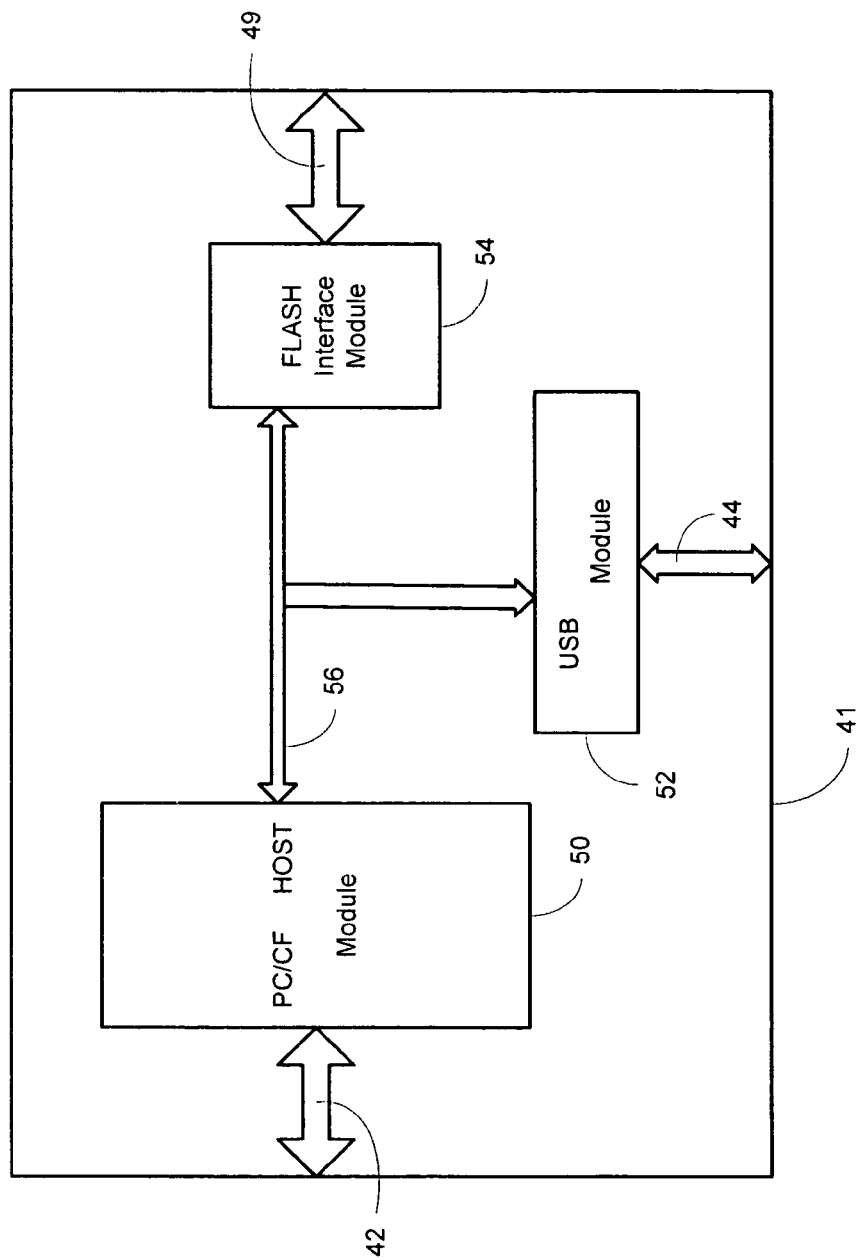
FIG. 5 shows the block diagram of a controller as employed in a preferred embodiment of the PC/CF card which supports both the PCMCIA/CF interface as well as the USB interface.

FIG. 5 depicts a block diagram of the controller 41 comprising the PC/CF host module 50, the USB module 52, the flash interface module 54 as well as the control bus 56 interconnecting all of the aforementioned modules. Controller 41 communicates with a host such as a digital camera through the PC/CF host interface bus 42. Additionally, controller 41 is in communication with a USB enabled device such as a computer, through the USB interface bus 44, and with the array of FLASH memory chips through the FLASH interface bus 49. Controller 41 receives and manages data using the PC/CF host module 50 and the USB module 52 and additionally reads and writes data using the FLASH interface module 54. The digital data (digital image representing a picture taken by the digital camera) is written to (or stored in) the array of FLASH memory 46 through the FLASH interface module 54. After downloading the same data to the computer through the USB module 52, the array of FLASH memory 46 is made available and the card 30 may be utilized to store additional digital images by inserting the card 30 into the digital camera.

Figure 6:
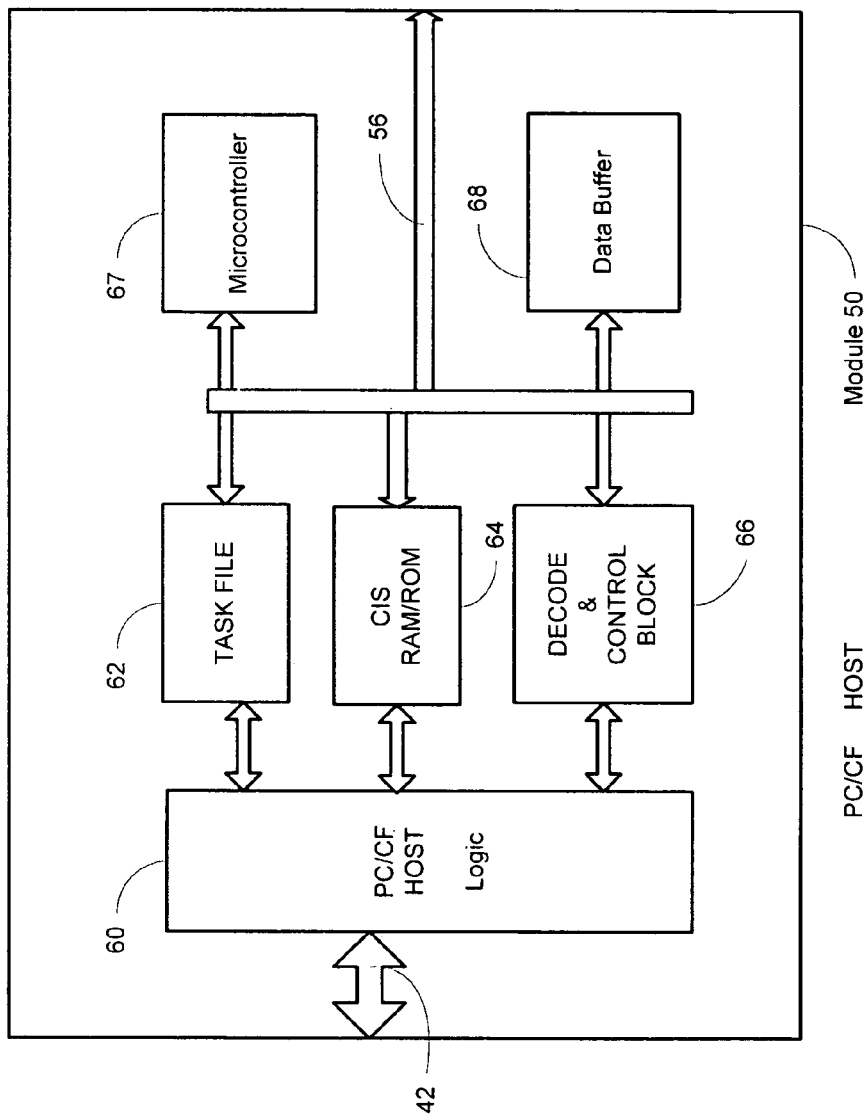
FIG. 6 shows the block diagram of the host interface portion of the controller.

FIG. 6 shows the PC/CF host module 50 according to an embodiment of the present invention. The PC/CF host module 50 includes the PC/CF host logic 60, which is in communication with a device such as a digital camera through the PC/CF host interface bus 42. The PC/CF module 50 also includes the task file 62, the CIS RAM/ROM 64 and the decode and control block 66, each one of which may communicate with the PC/CF host logic 60 and the microcontroller 67 and the data buffer 68. Also shown in FIG. 6 is the control bus 56, which connects the PC/CF host module 50 to other components of the controller 41 as shown in FIG. 5.

The PC/CF host module 50 establishes communications with a host device such as a digital camera through the PC/CF host interface bus 42. The host initializes the information to be read or written and then writes a command to the task file 62. Specifically, the host writes all of the drive information such as the cylinder number, the head number and so on followed by the specific command, such as READ. Once the drive information reaches the task file 62, the latter sends an interrupt to the microcontroller 67, which prompts the latter to execute the command. For instance, the microcontroller 67 executes the READ command based upon the drive information, which preceded the command such as the cylinder number, the head number and so on.

The CIS RAM/ROM 64 is needed only for the PCMCIA/CF interface. The CIS RAM/ROM 64 has a format for providing information identifying the manufacturer, the vendor such as Lexar Media Inc., drive information such as capacity, etc. The decode and control block 66 includes all of the logic necessary for decoding the messages sent to the task file 62 and the CIS RAM/ROM 64. Data, such as digitized information representing images of pictures taken by the digital camera, is stored temporarily in the data buffer 68 until the data is transferred permanently to the FLASH memory by the microcontroller 67. In one embodiment of the present invention, the data buffer 68 has a capacity between eight to ten sectors.

Figure 7:
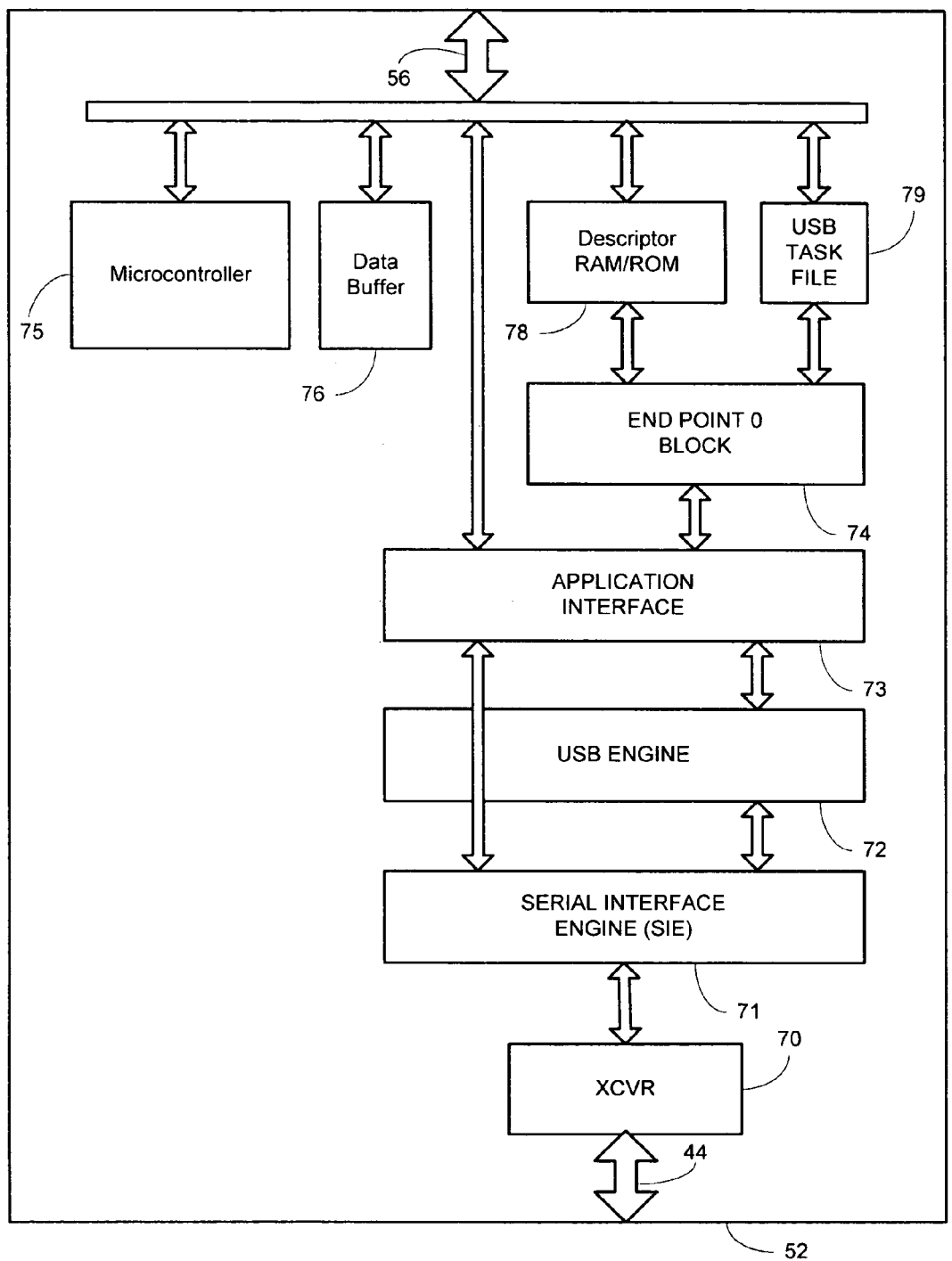
FIG. 7 shows the block diagram of the USB interface portion of the controller.

FIG. 7 depicts different components included within the USB interface module 52 of FIG. 5. A number of the components of the USB module 52 are also present in the PC/CF host module 50 shown in FIG. 6. The USB module 52 in FIG. 7 is shown to include the microcontroller 75, the data buffer 76 and the USB task file 79 as well as the descriptor RAM/ROM 78 which are functionally similar to their counterparts in the PC/CF host module 50. These components communicate with each other and other components of the controller 41 through the interface bus 56. The same components communicate with the application interface 73, which in turn communicates with the USB engine 72, the serial interface engine (SIE) 71 and the end point 0 block 74.

In FIG. 7, the descriptor RAM/ROM 78 is shown coupled to the end point 0 block 74 and the latter is further shown coupled to the task file 79. The application interface 73 is shown to be coupled further to the USB engine 72 and to the bus 56. The USB engine 72 is shown coupled to the SIE 71 and the SIE 71 is further coupled to the application interface 73 and to the transceiver 70. The transceiver 70 is shown coupled to the interface bus 44.

A computer communicates with the USB module 52 through two differential data lines, which serve as input to the USB module 52 through the USB interface bus 44 in a serial format. That is, the transceiver 70 is responsive to two data lines, carrying data in serial format, through the USB interface bus 44. The transceiver 70 converts the differential serial data into a digital serial signal. Subsequently, the SIE 71 converts the serial signals into parallel signals. The SIE 71 performs other functions such as Cyclic Redundancy Checking (CRC) and monitors the data to detect End of Packet (EOP) and Start of Packet (SOP) among other things. The USB engine 72 maintains track of data transfer from SOP to EOP. On SOP, the engine 72 checks the validity of the address and end point and initiates appropriate data transfer as determined by the end point.

The application interface 73 provides the appropriate mechanism to interface with the microcontroller 75. When data is received from a host such as a computer or when the host needs data, the application interface 73 sends an interrupt to the microcontroller 75. As part of the interrupt routine the microcontroller 75 writes data into the data buffer 76 or reads data from the data buffer 76.

The host, such as a computer, identifies the device parameters from the descriptor RAM/ROM 78 through the end point 0 block 74, otherwise known as the control pipe. The device parameters include information about Lexar Media Inc., vendor description, configuration, etc. In addition, as part of the descriptor RAM/ROM 78, the host determines what other end points exist. For the purposes of mass storage, as is the case for an embodiment of the present invention, there are two other end points, referred to as end points 2 and 3 or alternatively as bulk-in and bulk-out for reading and writing data. However, for applications involving real-time transfer of data, such as for modems or when music is being transferred, additional end points that establish isochronous pipe become necessary.

When the host is reading data the relevant USB command to be executed is the bulk-in and when the host is writing data the appropriate USB command is bulk-out. For example, in the USB module 52, the bulk-in command initiates reading 64 bytes of data. When the host asks its driver for reading additional data, the driver sends the control commands through the end point 0 block 74. The application interface 73 decodes the commands and writes them to the USB task file 79. Included within the command are the number of bytes and the address of the location where the command is written such as the head, cylinder, sector, etc.

Subsequently, the application interface 73 sends an interrupt to the microcontroller 75 prompting the latter to read the USB task file 79. The microcontroller 75 decodes the commands and processes them and, if necessary, transfers data from the FLASH memory chips 48 to the data buffer 76 wherein the data is being stored temporarily. Then the driver of the host sends the "IN" command, thereupon 64 bytes of data are transferred to the driver's data buffer through the bulk-in pipe. Once the data has been received successfully by the host USB engine, the latter acknowledges its receipt by sending an acknowledge command (ACK) to the USB engine 72 of the card 30. The driver may ask for more data in which case another packet of 64 bytes of data is transferred to the driver's data buffer. This process continues until all the data in the data buffer 76 has been transferred to the driver. The capacity of the data buffer 76 is typically 512 bytes. In the event the data has not been successfully transferred from the data buffer 76 to the host USB engine, when the IN command arrives the host USB engine sends a not acknowledge command (NAK) back to the USB engine 72 and the host USB engine resends the previous IN command. Subsequently the application interface 73 resets the data buffer pointer to point to the previous data packet and retransmits the previous packet of 64 data bytes.

The way transmission errors are detected is through the CRC mechanism which is embedded into the data as the latter is being serialized at SIE 71 prior to being transmitted to the host. Once in the host, the data is deserialized and if the CRC mechanism indicates that the data is fine, the host acknowledges the data and sends another IN command in order to receive an additional 64 bytes of data. However, if the host does not send any acknowledgement, then there is likely to be some problem with the transmission lines such as the lines being too noisy. But there could not have been any problem with the data itself or the data buffer 76, since in such cases different types of error messages would have been generated.

The pointers in the data buffer 76 are updated as the data is being read by the host. In the event there is no acknowledgement form the host, the latter asks for rewinding of the pointers and the pointers go back 64 bytes. On the other hand, if the microcontroller 75 cannot read the data, then an error message is generated by the latter, labeled STALL. The error message STALL is a protocol indicating that the bulk-in pipe is stalled. The SIE 71 subsequently sends the STALL command to the host. Once the STALL command has been received, the host realizes that a pipe has been stalled and reads the status of the pipe. The host then attempts to clear the stalled pipe by sending clear-stall command so that more data can be read through that pipe.

In a similar vein, when attempting to write data to the data buffer 76, the host first sends a write control command to the USB task file 79 through the end point 0 block 74. The host subsequently sends OUT commands through the bulk-out pipe. The application interface 73 responds to the OUT command by sending back the command NAK until it is ready to accept the data. Once received, the data is stored in the data buffer 76 until a whole sector is accumulated therein and is subsequently transferred to the FLASH memory.

In the standard defined by USB 1.1, the allowable maximum bulk data size is defined as 64 bytes. In the USB 2.0 standard, the maximum bulk data size is 512 bytes. Thus, all of the bulk transfers are 512 bytes. Consequently, all of the buffer pointer adjustments due to errors in transmission are also 512 bytes.

Through the USB module 52, it is also determined whether the device to which the card 30 is connected is a slow or a fast device. An example of a slow device is a mouse or a keyboard, whereas the card 30, according to an embodiment of the present invention as shown in FIG. 4, is a fast device. For slow devices the signals are not transmitted as quickly as they are transmitted when fast devices such as the card 30 or a hard disk is connected to the USB module 52.

An advantage of the present invention, as depicted in FIG. 7, is that the USB engine 72 communicates with the host using two different modes. One mode is the original USB mode called Advanced Technology Attachment (ATA) mode and the other is the default mode known as the bulk-only transport mass storage class mode. In the ATA mode, a separate driver associated with the host is needed, such as in Windows 98 operating system for PC's and in the bulk-only mass storage mode no separate driver is needed such as in Windows 2000 where a driver is already built into the operating system. When the card 30 is connected to a host having an operating system that supports bulk-only mass storage devices, then no driver will be required. However, when the card 30 is connected to a host having an operating system that does not support bulk-only mass storage class, such as Windows 98 operating system, then the driver will be invoked automatically. Once invoked, the driver issues a vendor-unique command to the card 30 in order to change its mode from bulk-only mass storage mode to the ATA mode so that all the subsequent communications between the driver and the card 30 will be in the ATA mode. The card 30 can communicate with both USB modes with the same USB engine 72 without requiring any upgrading.

While in the embodiment of the figures shown herein, the USB mass storage class bulk-only transport is implemented, it should be apparent to those skilled in the art that other USB mass storage class protocols, such as control/bulk/interrupt (CBI) transport could be implemented without departing from the scope and spirit of the present invention.

The card 30 may be used with different interface devices in a variety of configurations such as USB mode, PCMCIA mode, CF mode and ATA mode. To elaborate, consider FIG. 8(*a*) wherein controller 41 is shown. Controller 41 comprises the PC/CF host module 50, the FLASH interface module 54, and the USB module 52, all of which communicate with each other through the interface bus 56. Moreover, the interface bus 94, shown in FIG. 8(*a*), is shared between the PC/CF module 50 and the USB module 52. Interface bus 94 enables the card 30 to communicate with external devices in a variety of configurations such as USB mode, PCMCIA mode and ATA mode as described in a U.S. patent application entitled "IMPROVED COMPACT FLASH MEMORY CARD AND INTERFACE" having Ser. No. 09/034,173, filed on Mar. 2, 1998, the inventor of which are Petro Estakhri and Mahmud Assar, the disclosure of which is incorporated herein by reference as though set forth in full.

Since there is no requirement for having a second USB connector, sharing the same interface bus between the PC/CF module and a USB module would reduce the cost of manufacturing the card 30. Also, the USB connectors will not directly fit into the PC/CF card. Thus, if a separate USB connector is employed, it would have to be a custom-made connector meeting the physical requirements of the PC/CF card and having an adaptor for converting the custom connector to a standard USB connector.

Figure 8A:
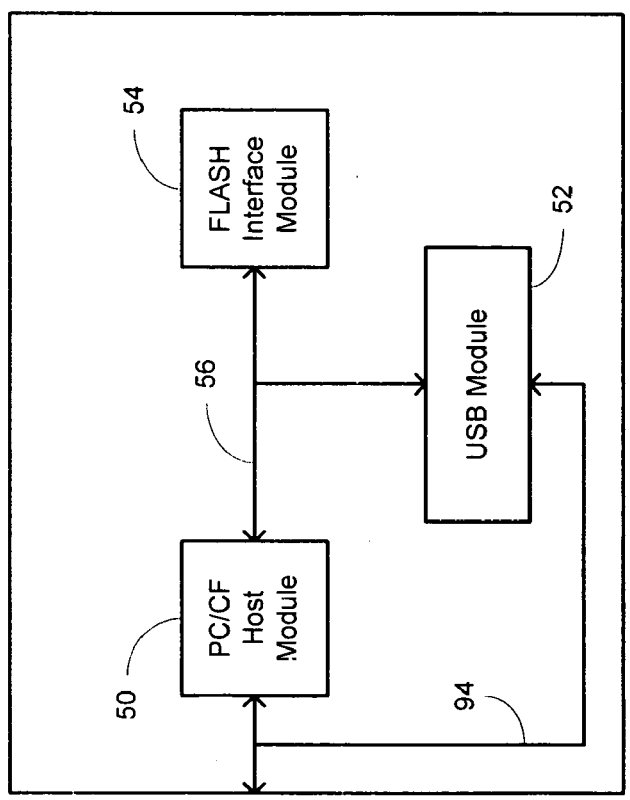
FIG. 8(a) shows the block diagram of a controller with shared PC/CF and USB interface bus.
Figure 8B:
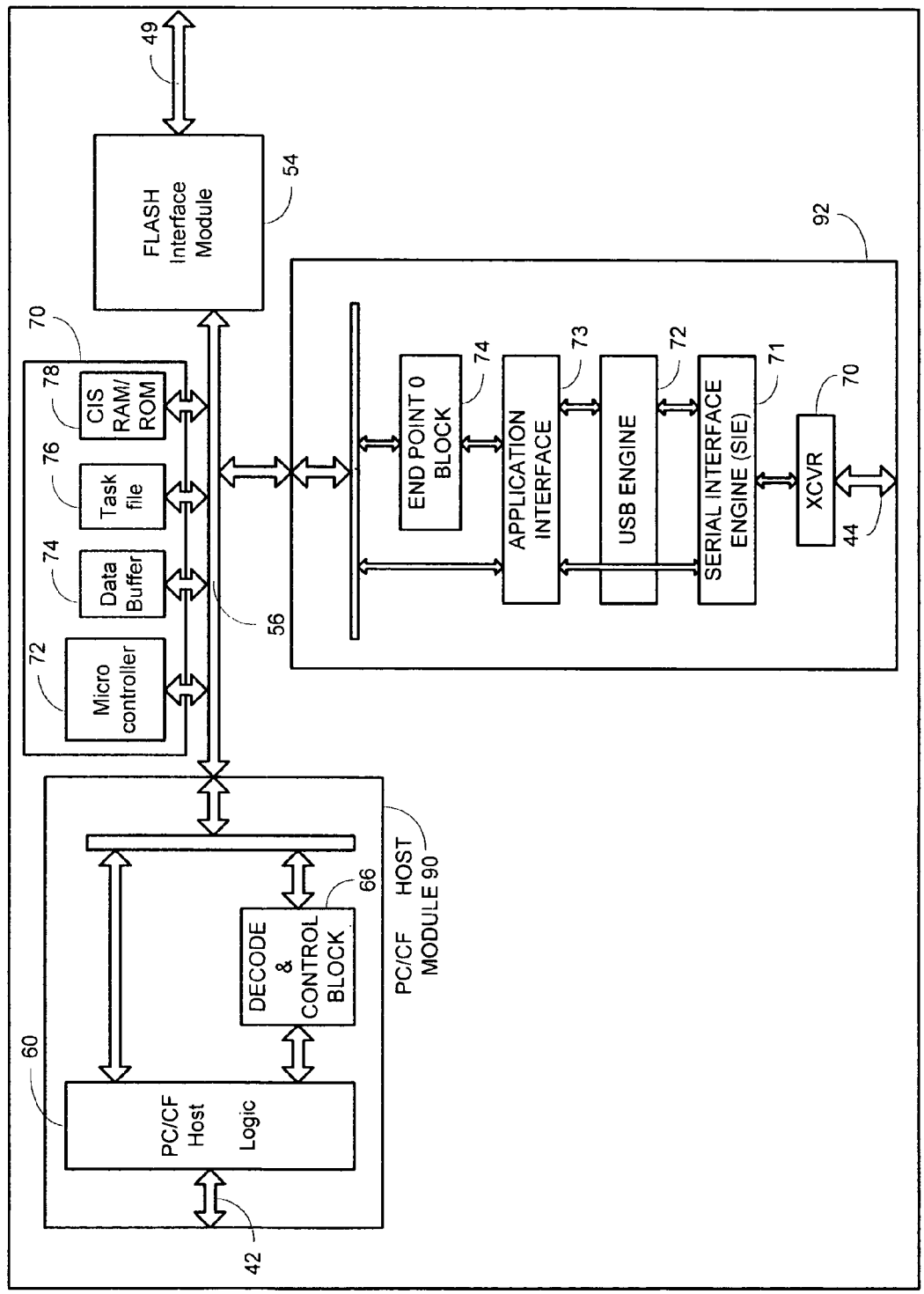
FIG. 8(b) shows the basic flow and interrelationships of the USB communication model.

Another advantage of the present invention is that some logic that is common to both the PC/CF host module 50 in FIG. 6 and the USB module 52 in FIG. 7 may be combined as shown in FIG. 8(*b*). In block 70, referred to as the common logic block, are assembled the microcontroller 72, the data buffer 74, the task file 76 and the CIS RAM/ROM 78. The components in the common logic block 70 in conjunction with the PC/CF host module 90 in FIG. 8(*b*) function in exactly the same way as the PC/CF host module 50 in FIG. 6. Similarly, the components in common logic block 70 with the USB module 92 in FIG. 8(*b*) function in exactly the same way as the USB module 52 in FIG. 7. Therefore an advantage is gained by not repeating the same logic in the two modules 90 and 92 in FIG. 8(*b*). The reason common logic block 70 can be shared between the said modules is that at any one time either the PC/CF host module 90 or the USB module 92 is communicating with the card 30. The card 30 communicates either with the PC/CF host module 90 through the interface bus 42 or with the USB module 92 through the USB interface bus 44 at any one time. Accordingly, data is read from one host first and then transferred to the other host.

Figure 1:
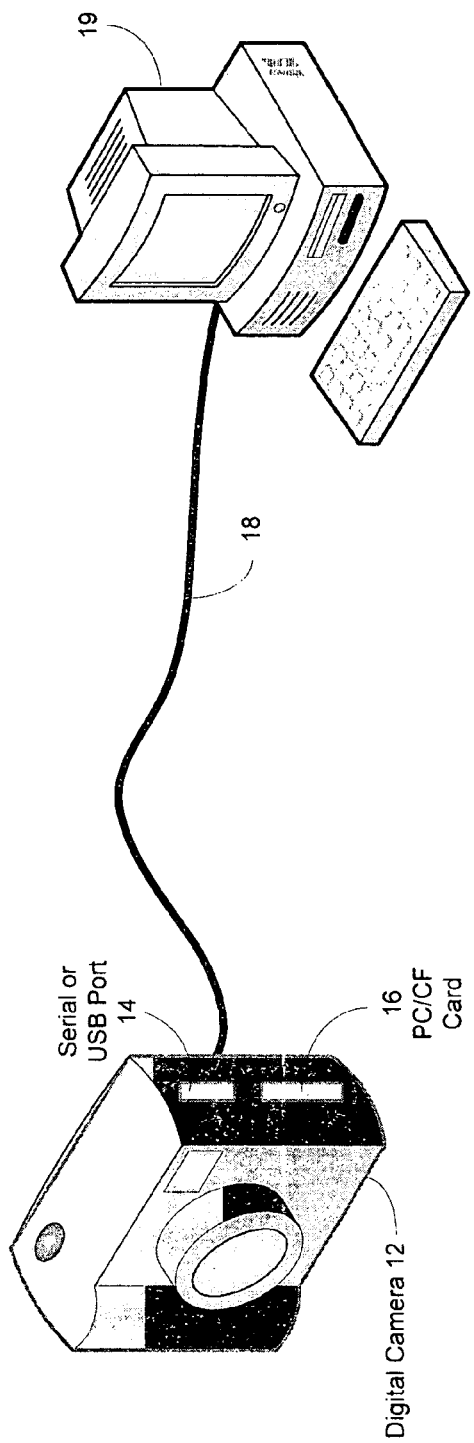
FIG. 1 shows the prior art USB enabled camera communicating with the computer.
Figure 2A:
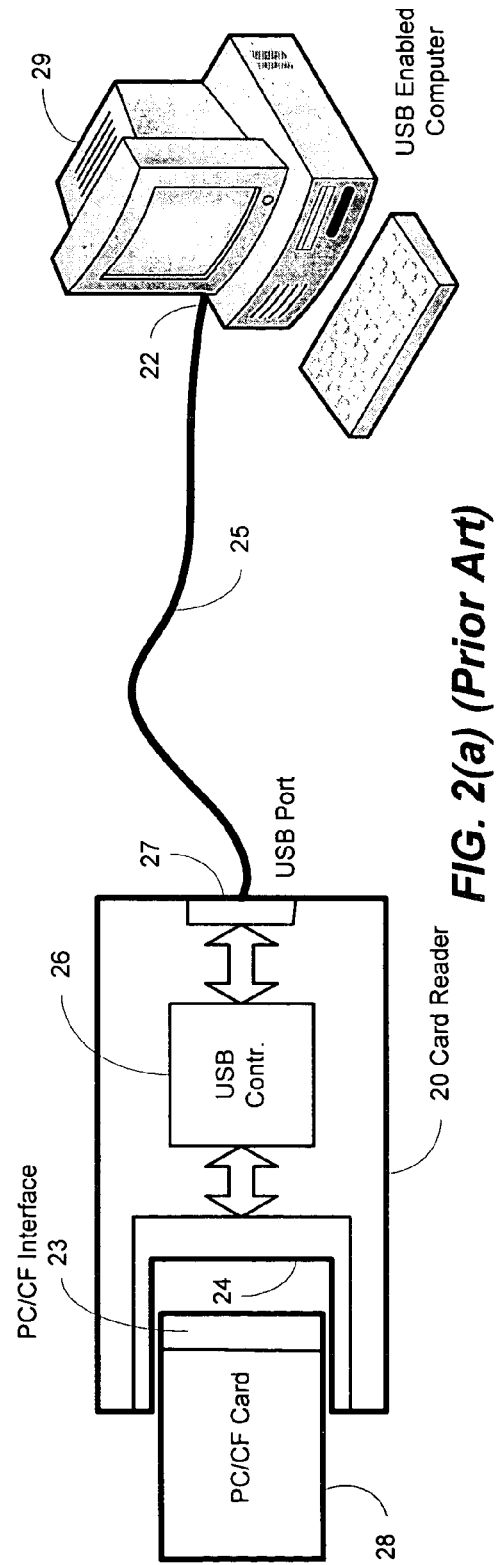
FIG. 2(a) shows the prior art card reader communicating with the computer.
Figure 2B:
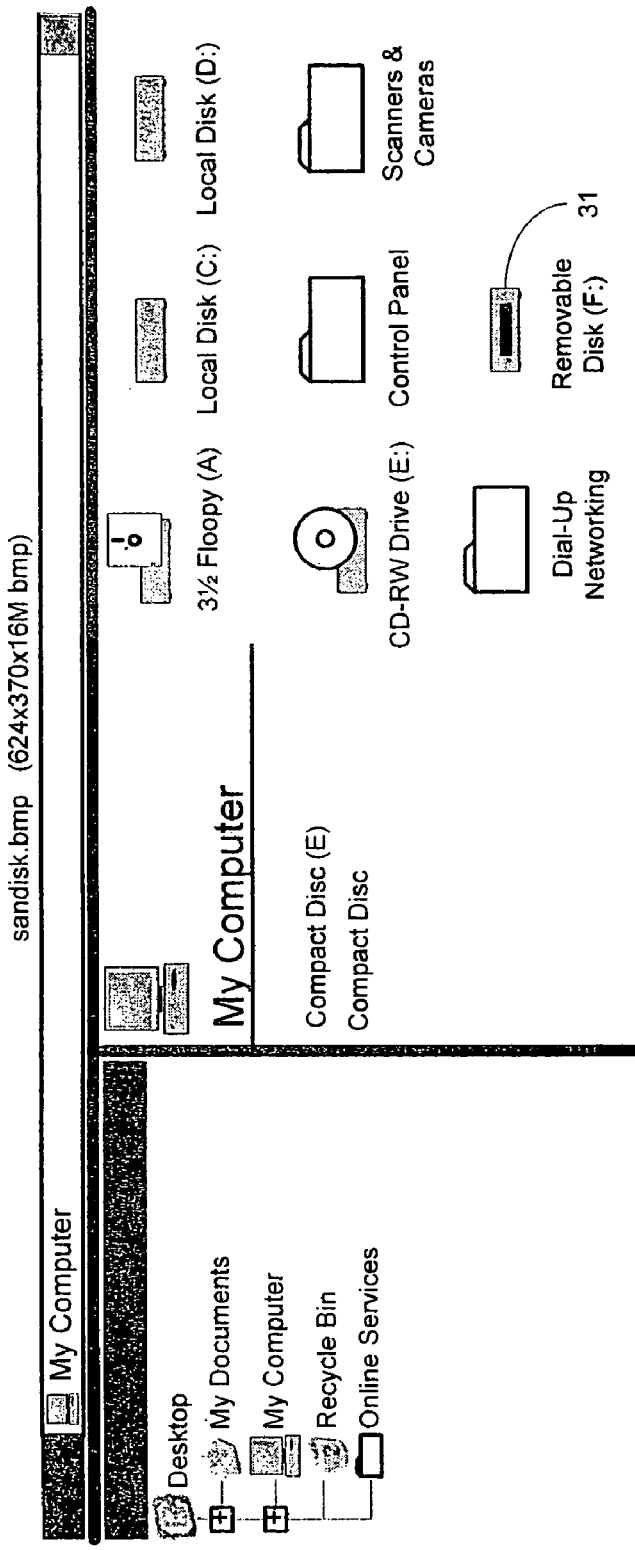
FIG. 2(b) shows the prior art computer screen while the card reader is connected to the computer.
Figure 9A:
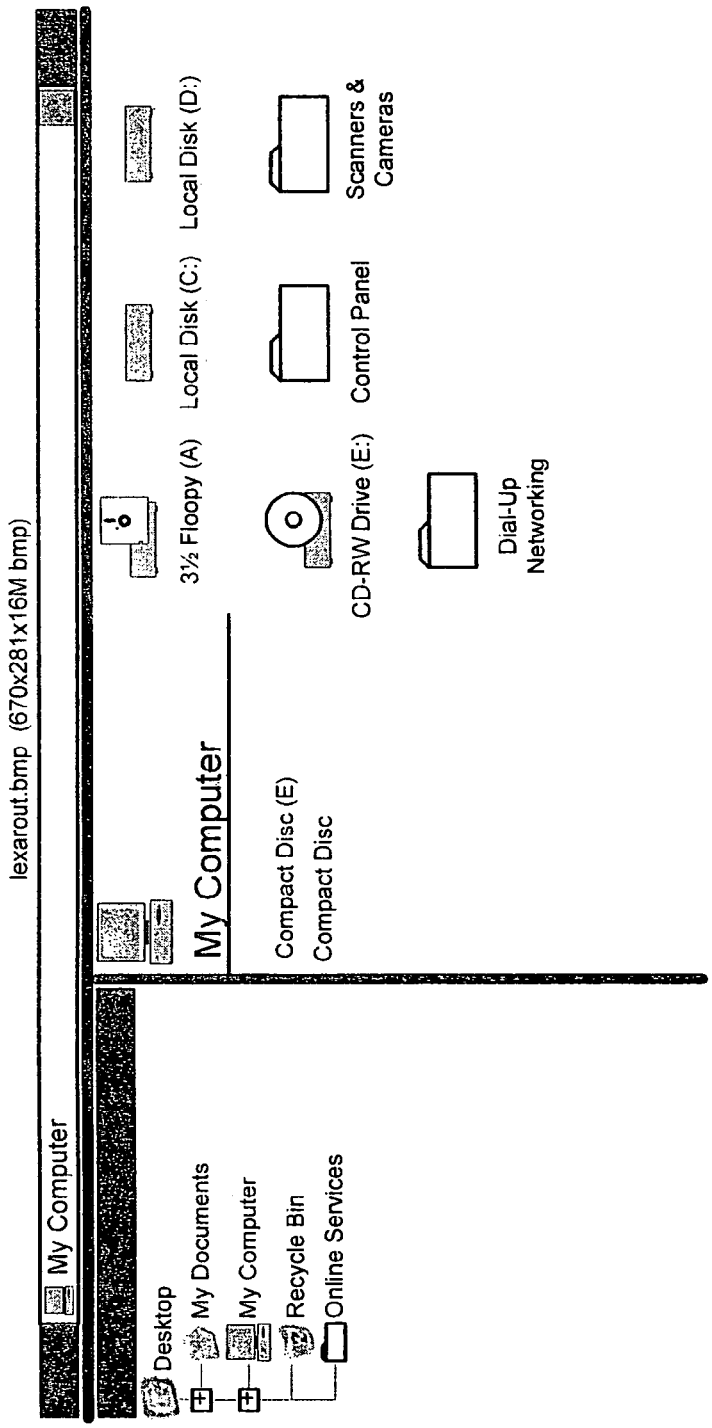
FIG. 9(a) shows a computer screen when the removable storage media (PC/CF) card is not connected to the computer.
Figure 9B:
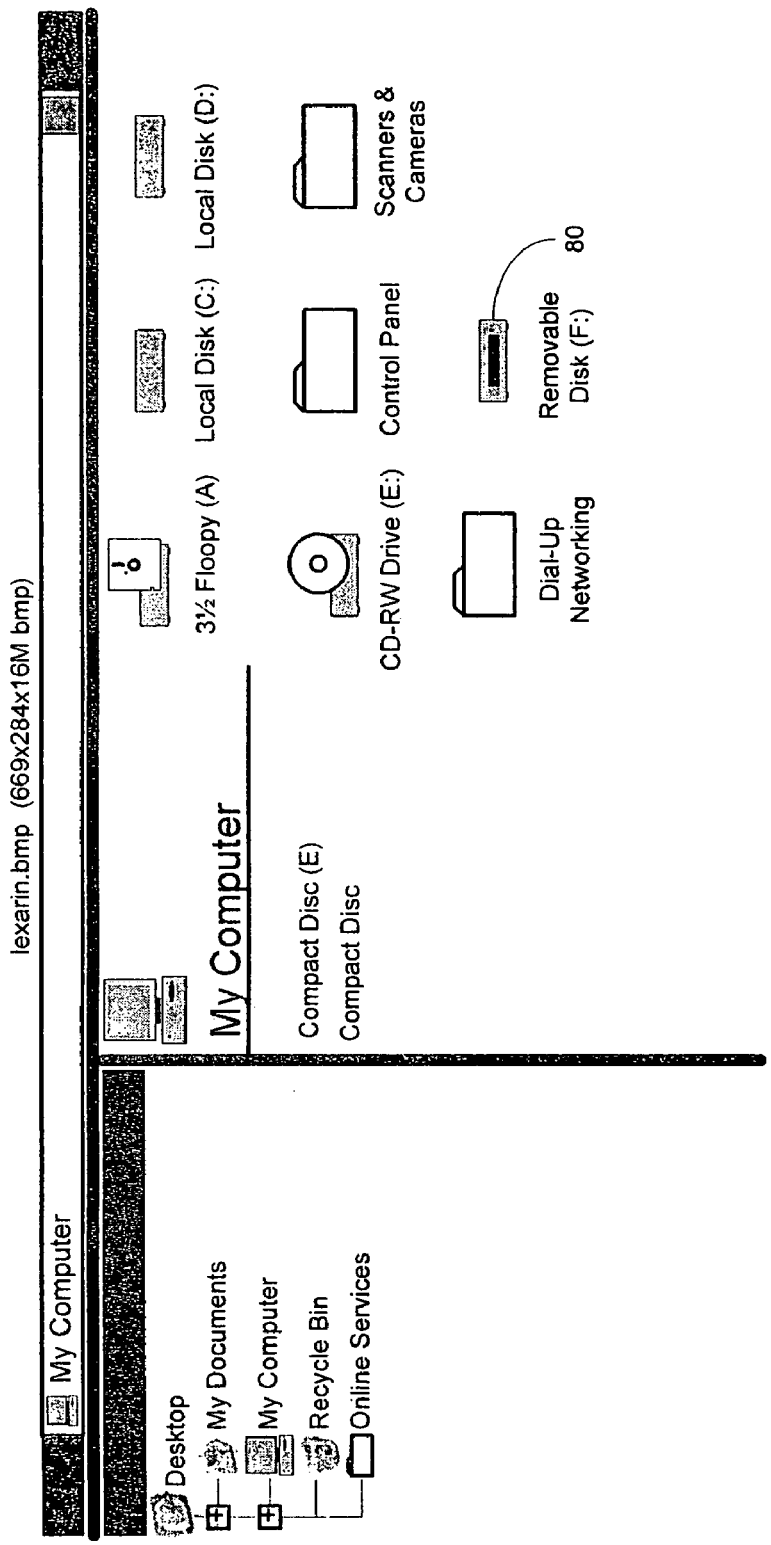
FIG. 9(b) shows a computer screen when the removable storage media (PC/CF) card is connected to the computer.

Another advantage in employing the card 30 is in overcoming the limitation of the prior art systems incorporating a card reader mechanism. For such systems when the card reader is connected to the computer an icon appears on the computer screen indicating that a removable disk is connected to the computer, as shown in FIG. 2(*b*). However, the card reader may not hold any card, thereby displaying a misleading icon on the screen. Employing the card 30, however, does not result in any misleading icon as shown in FIGS. 9(*a*) and 9(*b*). In FIG. 9(*a*) the card 30 has not been connected to the computer yet and hence there is no icon on the screen representing the removable disk F. Only when the card 30 is inserted into the computer does the icon 80 in FIG. 9(*b*) is displayed indicating that the card 30 has been connected. In addition, the prior art systems employing the card reader, as shown in FIG. 2(*a*), are significantly more expensive than the card 30 employed in the present invention. This is mainly due to the fact that all the logic associated with the USB circuitry has to reside on the card reader whereas for the card 30 all the USB logic is integrated into the controller 41 so that the remaining components and cables in the card 30 do not include any devices with USB logic.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A digital camera system having a digital camera and a computer for transferring pictures of images taken by the digital camera therebetween comprising:

a card removably and directly coupled, without any intermediary device, between the digital camera and the computer for temporarily storing the images by the digital camera and for transferring the temporarily stored images to the computer for viewing, editing and reproduction thereof, wherein the card is removably coupled to the computer for transferring the images to the computer and further wherein the card includes an interface module for receiving digital parallel images through a PCMCIA/CF interface and converting the same to serial digital images for transfer thereof to the computer using a Universal Serial Bus (USB) interface, the card further includes flash memory coupled to the PCMCIA/CF interface and the interface module for temporarily storing the digital images and the card further includes a common logic block for transferring the digital images between the flash memory and the PCMCIA/CF interface and for further transferring the digital images between the interface module and the flash memory.

2. A digital camera system as recited in claim 1 wherein the common logic block is shared between the PCMCIA/CF interface and the interface module thereby avoiding duplication of the common logic block.

3. A digital camera system as recited in claim 2 wherein the common logic block includes a microcontroller block for processing information received from the computer, through the interface module, and the digital camera, through the PCMCIA/CF interface, the common logic block further including a data buffer for temporarily storing digital images retrieved from the flash memory, a task file for storing commands received from the digital camera and the computer, and a CIS RAM/ROM for storing identification information.

4. A digital camera system as recited in claim 3 wherein the interface module includes an application interface for initiating communication between the computer and the microcontroller.

5. A digital camera system as recited in claim 4 wherein the USB standard is defined to include a first mode of application specifying a first data transfer mode and a second mode of application specifying a second data transfer mode, the interface module including a USB engine coupled to computer and the application interface wherein the USB engine operates to accommodate said first and second modes of application without the need for any modifications to the card.

6. A digital camera system as recited in claim 5 wherein the first mode of application is ATA and the second mode of application is bulk-only mass storage class.

7. A digital camera system as recited in claim 6 wherein the interface module further includes a transceiver coupled between the computer and the USB engine for converting digital images to analog images for transfer to the computer and for further converting analog images to digital images for transfer to the digital camera, the interface module further includes a serial interface engine for converting digital images in serial fashion to digital images in parallel fashion and for further converting digital images in parallel fashion to digital images in serial fashion.

8. A card for use in a digital camera system, the digital camera system having a digital camera and a computer for transferring pictures of images taken by the digital camera between the digital camera and the computer comprising:

a controller for controlling the transfer of images between the digital camera and the computer by transferring images, in digital format, to the digital camera through a first interface and for transferring the images to the computer through a second interface; and flash memory for temporarily storing the images, wherein the card is removably and directly coupled, without any intermediary device, between the digital camera and the computer for temporarily storing the images and for transferring the temporarily stored images to the computer for viewing, editing and reproduction thereof wherein the first interface is a PCMCIA/CF interface and the second interface is a USB interface and further wherein the controller includes a first interface module for causing communication between the card and the digital camera through the PCMCIA/CF interface, a second module for causing communication between the card and the computer through the USB interface and a third module coupled to the first and second modules for causing images to be transferred to the flash memory, the card further includes a common logic block for transferring the digital images between the flash memory and the first module and for further transferring the digital images between the second module and the flash memory, wherein the common logic block is shared between the first module and the second module thereby avoiding duplication of the common logic block.

9. A card for use in a digital camera system as recited in claim 8 wherein the computer includes a screen viewable by a user of the computer, the card for causing an icon to be shown on the screen when the card is coupled to the computer and for further causing the icon not to be shown on the screen when the card is removed from the computer.

10. A card for use in a digital camera system as recited in claim 8 wherein the common logic block includes a microcontroller block for processing information received from the computer, through the second module, and information received from the digital camera, through the PCMCIA/CF interface, the common logic block further including a data buffer for temporarily storing digital images retrieved from the flash memory, a task file for storing commands received from the digital camera and the computer, and a CIS RAM/ROM for storing identification information.

11. A card for use in a digital camera system as recited in claim 10 wherein the USB standard is defined to include a first mode of application specifying a first data transfer mode and a second mode of application specifying a second data transfer mode, the interface module including a USB engine coupled to computer and an application interface wherein the USB engine operates to accommodate said first and second modes of application without the need for any modifications to the card.

12. A card for use in a digital camera system as recited in claim 11 wherein the first mode of application is ATA and the second mode of application is bulk-only mass storage class.

13. A card for use in a digital camera system as recited in claim 12 wherein the second module further includes a transceiver coupled between the computer and the USB engine for converting digital images to analog images for transfer thereof to the computer and for further converting analog images to digital images for transfer thereof to the digital camera, the second module yet further includes a serial interface engine for converting digital images in serial fashion to digital images in parallel fashion and for further converting digital images in parallel fashion to digital images in serial fashion.

14. A method of transferring pictures of images taken by a digital camera between a digital camera and a computer comprising:

removably connecting a card for transferring images in digital format to the digital camera via a PCMCIA/CF interface and to the computer using a Universal Serial BUS (USB) interface;

receiving digital parallel images, by an interface module, through the PCMCIA/CF interface;

converting the received digital parallel images to serial digital images for transfer thereof to the computer using the USB interface;

temporarily storing the digital images in flash memory;

transferring the stored images between flash memory included in the card and the PCMCIA/CF interface; and further transferring the stored images between the interface module and the flash memory.

\* \* \* \* \*